US010635485B2

(12) United States Patent
Chagam Reddy

(10) Patent No.: US 10,635,485 B2
(45) Date of Patent: Apr. 28, 2020

(54) DEVICES, SYSTEMS, AND METHODS FOR LOCKLESS DISTRIBUTED OBJECT INPUT/OUTPUT

(71) Applicant: Intel Corporation, Santa Clara, CA (US)

(72) Inventor: Anjaneya Reddy Chagam Reddy, Chandler, AZ (US)

(73) Assignee: Intel Corporation, Santa Clara, CA (US)

(*) Notice: Subject to any disclaimer, the term of this patent is extended or adjusted under 35 U.S.C. 154(b) by 149 days.

(21) Appl. No.: 15/934,799

(22) Filed: Mar. 23, 2018

(65) Prior Publication Data

US 2019/0050255 A1    Feb. 14, 2019

(51) Int. Cl.
| | |
|---|---|
| *G06F 9/46* | (2006.01) |
| *G06F 9/48* | (2006.01) |
| *G06F 9/52* | (2006.01) |
| *H04L 29/08* | (2006.01) |
| *G06F 9/54* | (2006.01) |
| *G06F 9/50* | (2006.01) |

(52) U.S. Cl.
CPC .......... *G06F 9/4881* (2013.01); *G06F 9/5016* (2013.01); *G06F 9/5077* (2013.01); *G06F 9/52* (2013.01); *G06F 9/546* (2013.01); *H04L 67/1097* (2013.01); *G06F 2209/5017* (2013.01)

(58) Field of Classification Search
CPC ........ G06F 9/46; G06F 9/5016; G06F 9/5077; G06F 9/52; G06F 9/546
See application file for complete search history.

(56) References Cited

U.S. PATENT DOCUMENTS

| | | | | |
|---|---|---|---|---|
| 2007/0153681 | A1* | 7/2007 | Steeb ................ | H04L 43/18 370/229 |
| 2017/0109199 | A1* | 4/2017 | Chen ................. | G06F 9/4881 |
| 2017/0300228 | A1* | 10/2017 | Gollapudi .......... | G06F 3/061 |

* cited by examiner

*Primary Examiner* — Camquy Truong
(74) *Attorney, Agent, or Firm* — Thorpe North & Western, LLP

(57) ABSTRACT

An object node apparatus, system, and method are described. An apparatus can include a lockless-mode controller configured to communicatively couple to a plurality of storage resources and to a plurality of processor cores each preassigned to process a specific type of sub-task at a different preassigned storage resource that is configured to receive object input/output (I/O) only from the preassigned core, the lockless-mode controller being further configured to receive a plurality of object I/O messages from one or more clients, each to perform an object I/O task, divide each object I/O task into a plurality of sub-tasks, identify a specific sub-task type for each sub-task, and send each sub-task for each specific sub-task type to a processor core preassigned to process the specific sub-task type, wherein the sub-tasks include storage operations related to storing sub-object data in, or retrieving sub-object data from, the preassigned storage resource for each processor core.

24 Claims, 8 Drawing Sheets

DEVICES, SYSTEMS, AND METHODS FOR LOCKLESS DISTRIBUTED OBJECT INPUT/OUTPUT

BACKGROUND

Computer systems can employ a variety of storage methods to store data both for short term use and long-term use. Systems that are used to store and deliver large amounts of data can use a distributed object store system to efficiently meet client needs. As such, distributed object stores are becoming a de-facto standard for serving workloads such as content delivery networks (CDN), big data analytics, genomics, and artificial intelligence tasks.

Traditional object stores employ hard disk drives (HDDs). The performance characteristics of hard disk drives are such that the existing mechanisms for managing the operation of object stores do not impact the speed at which the object stores operate. For example, traditional object nodes include kernel mode constructs, file system interfaces and expensive locking mechanisms to control shared resources. However, when using storage mediums with higher performance characteristics (e.g., non-volatile flash storage), these mechanisms represent an unacceptable bottleneck for many types of tasks. As innovations in solid state drive technology (e.g., flash storage technology) drive higher densities with significantly better performance, new methods of storing and retrieving object data from object nodes can improve overall performance.

BRIEF DESCRIPTION OF THE DRAWINGS

Features and advantages of example embodiments will be apparent from the detailed description which follows, taken in conjunction with the accompanying drawings, which together illustrate, by way of example, features; and, wherein.

Figure 1:
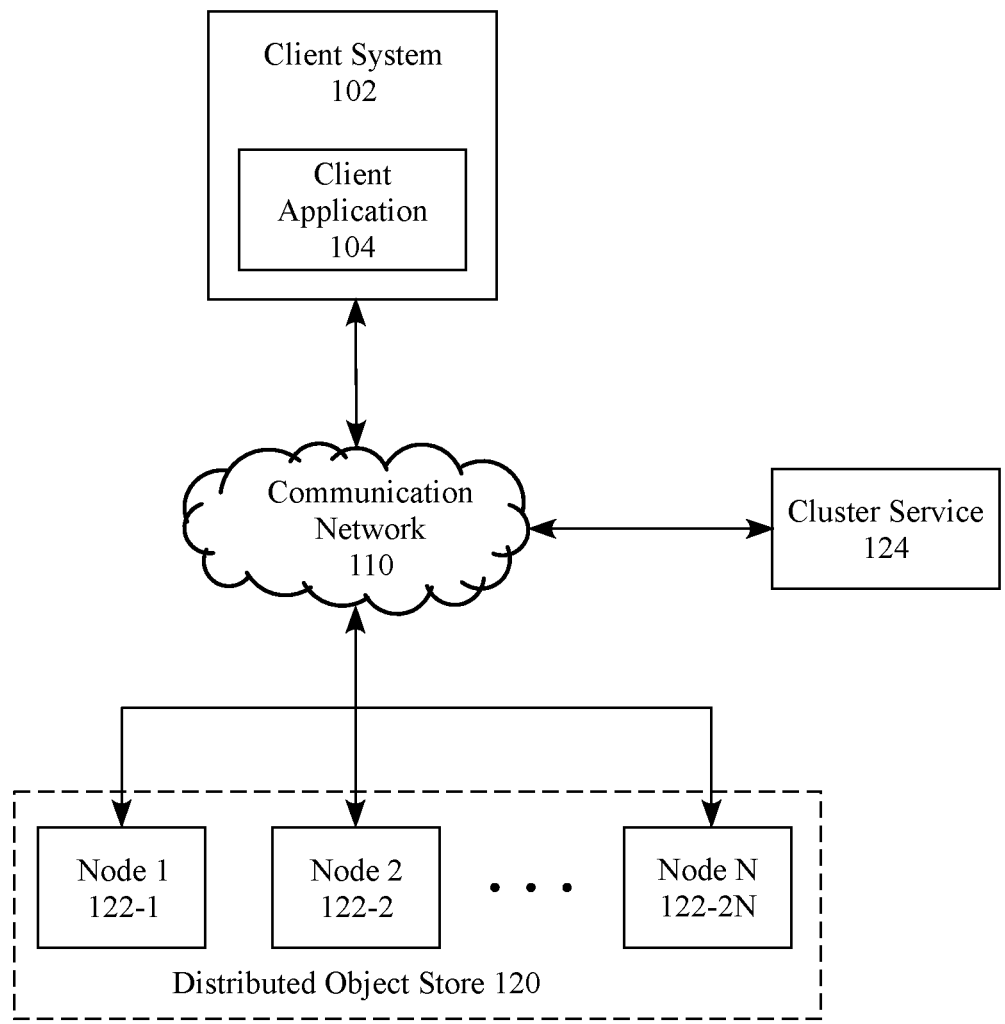
FIG. 1 illustrates an example distributed object store includes a plurality of nodes (e.g., object servers) and a cluster service.

Reference will now be made to the exemplary embodiments illustrated, and specific language will be used herein to describe the same. It will nevertheless be understood that no limitation on scope is thereby intended.

DESCRIPTION OF EMBODIMENTS

Before the disclosed example embodiments are described, it is to be understood that this disclosure is not limited to the particular structures, process steps, or materials disclosed herein, but is extended to equivalents thereof as would be recognized by those ordinarily skilled in the relevant arts. It should also be understood that terminology employed herein is used for the purpose of describing particular examples or embodiments only and is not intended to be limiting. The same reference numerals in different drawings represent the same element. Numbers provided in flow charts and processes are provided for clarity in illustrating steps and operations and do not necessarily indicate a particular order or sequence.

Furthermore, the described features, structures, or characteristics can be combined in any suitable manner in one or more embodiments. In the following description, numerous specific details are provided, such as examples of layouts, distances, network examples, etc., to provide a thorough understanding of various embodiments. One skilled in the relevant art will recognize, however, that such detailed embodiments do not limit the overall inventive concepts articulated herein, but are merely representative thereof.

As used in this specification and the appended claims, the singular forms "a," "an" and "the" include plural referents unless the context clearly dictates otherwise. Thus, for example, reference to "a bit line" includes a plurality of such bit lines.

Reference throughout this specification to "an example" means that a particular feature, structure, or characteristic described in connection with the example is included in at least one embodiment. Thus, appearances of the phrases "in an example" or "an embodiment" in various places throughout this specification are not necessarily all referring to the same embodiment.

As used herein, a plurality of items, structural elements, compositional elements, and/or materials can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and examples can be referred to herein along with alternatives for the various components thereof. It is understood that such embodiments, examples, and alternatives are not to be construed as de facto equivalents of one another, but are to be considered as separate and autonomous representations under the present disclosure.

Furthermore, the described features, structures, or characteristics can be combined in any suitable manner in one or more embodiments. In the following description, numerous specific details are provided, such as examples of layouts, distances, network examples, etc., to provide a thorough understanding of embodiments. One skilled in the relevant art will recognize, however, that the technology can be practiced without one or more of the specific details, or with other methods, components, layouts, etc. In other instances, well-known structures, materials, or operations may not be shown or described in detail to avoid obscuring aspects of the disclosure.

In this disclosure, "comprises," "comprising," "containing" and "having" and the like can have the meaning ascribed to them in U.S. Patent law and can mean "includes," "including," and the like, and are generally interpreted to be open ended terms. The terms "consisting of" or "consists of" are closed terms, and include only the components, structures, steps, or the like specifically listed in conjunction with such terms, as well as that which is in accordance with U.S. Patent law. "Consisting essentially of" or "consists essentially of" have the meaning generally ascribed to them by U.S. Patent law. In particular, such terms are generally closed terms, with the exception of allowing inclusion of additional items, materials, components, steps, or elements, that do not materially affect the basic and novel characteristics or function of the item(s) used in connection therewith. For example, trace elements present in a composition, but not affecting the compositions nature or characteristics would be permissible if present under the "consisting essentially of" language, even though not expressly recited in a list of items following such terminology. When using an open ended term in this specification, like "comprising" or "including," it is understood that direct support should be afforded also to "consisting essentially of" language as well as "consisting of" language as if stated explicitly and vice versa.

The terms "first," "second," "third," "fourth," and the like in the description and in the claims, if any, are used for distinguishing between similar elements and not necessarily for describing a particular sequential or chronological order. It is to be understood that any terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

As used herein, comparative terms such as "increased," "decreased," "better," "worse," "higher," "lower," "enhanced," and the like refer to a property of a device, component, or activity that is measurably different from other devices, components, or activities in a surrounding or adjacent area, in a single device or in multiple comparable devices, in a group or class, in multiple groups or classes, or as compared to the known state of the art. For example, a data region that has an "increased" risk of corruption can refer to a region of a memory device which is more likely to have write errors to it than other regions in the same memory device. A number of factors can cause such increased risk, including location, fabrication process, number of program pulses applied to the region, etc.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, the term "about" is used to provide flexibility to a numerical range endpoint by providing that a given value may be "a little above" or "a little below" the endpoint. However, it is to be understood that even when the term "about" is used in the present specification in connection with a specific numerical value, that support for the exact numerical value recited apart from the "about" terminology is also provided.

Numerical amounts and data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 1.5, 2, 2.3, 3, 3.8, 4, 4.6, 5, and 5.1 individually.

This same principle applies to ranges reciting only one numerical value as a minimum or a maximum. Furthermore, such an interpretation should apply regardless of the breadth of the range or the characteristics being described.

An initial overview of technology embodiments is provided below, and then specific technology embodiments are described in further detail later. This initial summary is intended to aid readers in understanding the technology more quickly, but is not intended to identify key or essential technological features nor is it intended to limit the scope of the claimed subject matter. Unless defined otherwise, all technical and scientific terms used herein have the same meaning as commonly understood by one of ordinary skill in the art to which this disclosure belongs.

Distributed object stores are becoming more widely used for serving workloads, particularly large workloads such as content delivery networks (CDN), big data analytics, genomics, artificial intelligence, and the like. Object-based storage systems can allow retention of large amounts of unstructured data, which can include for example, the data of the object, metadata, and an object identifier. By storing such objects in a distributed fashion, the objects can be protected from system failures, such as storage media failure, data center disasters, and the like. Traditional object storage techniques were designed for writing to magnetic hard disk drives (HDDs) that do not require high performance.

Traditional shared object stores employ kernel mode constructs that include switching between kernel mode and user mode, file system interfaces to manage data storage and retrieval, and data locking mechanisms to prevent simultaneous access of data that can create data inconsistencies. Specifically, data locking mechanisms prevent more than one process (or core) from accessing the same storage resource, or the same portion of a storage resource, in a manner that could result in data inconsistency. Once a core has finished accessing the storage resource or portion of the storage resource, the data lock is removed, thus allowing access by another core. Such traditional techniques for managing shared object storage are not ideal for high density storage media such as NAND flash, for example. Innovations in storage media are resulting in increased density storage devices with significantly better performance compared to HDDs that is not being utilized under the traditional shared object storage schemes, where delays caused by kernel mode constructs, file system interfaces, and data locking can create unnecessary performance bottlenecks.

The present technology provides techniques for delivering high performance object storage that implements input/output (IO) operations in user mode without data locking, and that eliminates the file system layer using direct IO. This can be accomplished by splitting the monolithic object processing data plane logic into sub-tasks that are then pinned to specific cores with an efficient zero copy message passing protocol to control the execution flow. In other words, a data object can be divided into a plurality of sub-objects, and each sub-object can be stored in a particular storage resource or partition of a storage resource. Only a single core has access to the particular storage resource or partition for IO operations, and as such, there is no need for data locking as that single core will execute all IO operations to the storage resource or partition. Locking can be implemented during times when multiple cores operate on same storage resource (e.g. background scrubbing), for example, after which the core can return to performing direct IO operations in lockless mode. Furthermore, consistent hashing techniques can be used to direct object-related operations to the proper storage resource, partition, media, etc. Such consistent hashing can facilitate the avoidance of hot spots, and scheduling processes can utilize various priority and anti-starvation schemes to help ensure that both client and background operations receive a fair share of system resources.

More specifically, when a message relating to an object I/O task is received, the object I/O task can be divided into sub-tasks to store or retrieve a sub-object associated with each sub-task. Each sub-task (and its associated sub-object) is processed by a processor core that is pre-assigned to interface with the storage resource specific to the particular sub-object of each sub-task. With only one core accessing a given storage resource, the object storage system does not need to implement data locking for object I/O operations (i.e., when in a lockless mode). For example, a single read request for a stored object can be broken up into a plurality of sub-tasks, each running on a different core and retrieving a sub-object from the appropriate storage resource that stores the associated portion of the object. Because only a single core is accessing each storage resource containing a sub-object, simultaneous access of a storage resource does not occur. In other words, a given storage resource will only receive hardware threads from one preassigned core for object I/O tasks. Additionally, a storage resource can be implemented at a number of storage sizes or "granularities" that are preassigned to particular cores, depending on various factors such as system design, for example. It is noted, however, that such storage resource granularities can be established at a size that is large enough to facilitate efficient single-core processing of the sub-tasks in a lockless manner without core interference between memory resources, while at the same time small enough to avoid cores having to wait for other cores to finish sub-task processing before proceeding to the next object, for example. The delineation between storage resources can be a physical partition, a logical partition, or the like. Nonlimiting examples of physical partitions that can be used to establish a storage resource to which a single core is preassigned can include one or more storage drives, as well as any physical partitions within a drive, such as a die, a bank, a rank, a channel, and the like, including multiples thereof. For logical partitioning to define storage resources, a drive or other physical memory device can be partitioned into multiple logical partitions based on capacity, performance, endurance needs, and the like, using any compatible partitioning method, including namespace techniques, for example. In some implementations, a storage resource can include multiple partitions.

Once an object I/O task is subdivided into a plurality of sub-tasks, a specific type of sub-task can be determined for each of the plurality of sub-tasks, and each sub-task can be sent to a processor core that has been preassigned to process each type of sub-task. In other words, sub-tasks are sent to different processor cores according to sub-task type. In this way, client messages can be routed to the pre-assigned storage resource via a pre-assigned core without the need to switch contexts (e.g., into an operation system mode or a kernel context mode) at any point in the process.

Additionally, each processor core can be associated with a particular storage resource. Once specific type of sub-task has been assigned to a processor core, only the assigned processor core will access storage resources associated with that task when performing I/O operations. In this way, no data locking mechanism is necessary because no simultaneous access of data is possible.

When messages are received from clients, the object node decodes the message to identify the object I/O task, which is then divided into the plurality of sub-tasks. The object node (or controller) then directs each sub-task to a particular core according to sub-task type. In some examples, the object node directs the sub-task to an I/O queue. Each processor core can include a listening app or unit that periodically polls the I/O queue for sub-tasks having the assigned sub-task type for that processor core.

In some examples, consistent hashing algorithms can be used to distribute sub-tasks to particular processor cores according to sub-task type. In this way, the distributed data object stores can avoid hot spots by spreading the sub-tasks across a number of cores and storage media. Prioritized queues and anti-starvation schemes can be used to ensure both client and background operations get a fair share of system resources. Having assigned cores for each sub-task and only allowing assigned cores to access data associated with those tasks on particular storage resources ensures that each task is not dependent on another object or task. Thus, operations performed at each object node do not create bottlenecks to overall system performance.

In one example, objects/sub-objects are stored in one or more storage resources at, for example, various object nodes. The storage resources generally include nonvolatile memory (NVM) as a storage medium, which does not require power to maintain the state of data stored by the medium. NVM has traditionally been used for the task of data storage, or long-term persistent storage, but new and evolving memory technologies allow the use of NVM in roles that extend beyond traditional data storage. One example of such a role is the use of NVM as main or system memory. Non-volatile system memory (NVMsys) can combine data reliability of traditional storage with ultra-low latency and high bandwidth performance, having many advantages over traditional volatile memory, such as high density, large capacity, lower power consumption, and reduced manufacturing complexity, to name a few. Byte-addressable, write-in-place NVM such as three-dimensional (3D) cross-point memory, for example, can operate as byte-addressable memory similar to dynamic random-access memory (DRAM), or as block-addressable memory similar to NAND flash. In other words, such NVM can operate as system memory or as persistent storage memory (NVMstor). In some situations where NVM is functioning as system memory, stored data can be discarded or otherwise rendered unreadable when power to the NVMsys is interrupted.

NVMsys also allows increased flexibility in data management by providing non-volatile, low-latency memory that can be located closer to a processor in a computing device. In some examples, NVMsys can reside on a DRAM bus, such that the NVMsys can provide ultra-fast DRAM-like access to data. NVMsys can also be useful in computing environments that frequently access large, complex data sets, and environments that are sensitive to downtime caused by power failures or system crashes.

Non-limiting examples of NVM can include planar or three-dimensional (3D) NAND flash memory, including single or multi-threshold-level NAND flash memory, NOR flash memory, single or multi-level Phase Change Memory (PCM), such as chalcogenide glass PCM, planar or 3D PCM, cross-point array memory, including 3D cross-point memory, non-volatile dual in-line memory module (NVDIMM)-based memory, such as flash-based (NVDIMM-F) memory, flash/DRAM-based (NVDIMM-N) memory, persistent memory-based (NVDIMM-P) memory, 3D cross-point-based NVDIMM memory, resistive RAM (ReRAM), including metal-oxide- or oxygen vacancy-based ReRAM, such as $HfO_2$-, $Hf/HfO_x$-, $Ti/HfO_2$-, $TiO_x$-, and $TaO_x$-based ReRAM, filament-based ReRAM, such as $Ag/GeS_2$-, $ZrTe/Al_2O_3$-, and Ag-based ReRAM, programmable metallization cell (PMC) memory, such as conductive-bridging RAM (CBRAM), silicon-oxide-nitride-oxide-silicon (SONOS) memory, ferroelectric RAM (FeRAM), ferroelectric transistor RAM (Fe-TRAM), anti-ferroelectric memory, polymer memory (e.g., ferroelectric polymer memory), magnetoresistive RAM (MRAM), write-in-place non-volatile MRAM (NVMRAM), spin-transfer torque (STT) memory, spin-orbit torque (SOT) memory, nanowire memory, electrically erasable programmable read-only memory (EEPROM), nanotube RAM (NRAM), other memristor- and thyristor-based memory, spintronic magnetic junction-based memory, magnetic tunneling junction (MTJ)-based memory, domain wall (DW)-based memory, and the like, including combinations thereof. The term "memory device" can refer to the die itself and/or to a packaged memory product. NVM can be byte or block addressable. In some examples, NVM can comply with one or more standards promulgated by the Joint Electron Device Engineering Council (JEDEC), such as JESD21-C, JESD218, JESD219, JESD220-1, JESD223B, JESD223-1, or other suitable standard (the JEDEC standards cited herein are available at www.jedec.org). In one specific example, the NVM can be 3D cross-point memory. In another specific example, the NVM can be NAND or 3D NAND memory. In another specific example, the NVM can be STT memory.

The present technology can provide a number of benefits. For example, removing the need for data locking and context switching from object IO processes allows an object storage system to utilize the higher performance characteristics of many solid-state memory technologies that have been underutilized, or not utilized at all, in traditional distributed object storage systems that rely on kernel mode constructs, file system interfaces, and data locking. More fully utilizing the higher performance capabilities of such storage resources can increase the overall performance and effectiveness of the system at managing data objects, which in some cases can reduce the frequency of hardware and storage resource upgrades. In some examples, freed system processes can be used to increase processing performance of taxing workloads, such as artificial intelligence tasks, genomic analysis, big data analytics, and the like.

FIG. 1 illustrates an example distributed object store 120 including a plurality of object nodes (e.g., object servers) 122-1 to 122-N and a cluster service 124. The plurality of object nodes 122-1 to 122-N and the cluster service 124 receive requests from one or more client systems 102. One or more communication networks 110 interconnect these components. The communication networks 110 may be any of a variety of network types, including local area networks (LANs), wide area networks (WANs), wireless networks, wired networks, the Internet, personal area networks (PANs), or a combination of such networks.

Object stores provide the ability to pool storage capacity from multiple object nodes and distribute multiple copies of an object (e.g., a file or other data) in a cluster of object nodes to avoid single point failures and to provide services to users in different locations. Thus, each object node 122-1 to 122-N includes storage media (e.g., an SSD or other storage resource) as well as one or more processors. The term "processor" can include a single processor or multiple processors, including single core processors and multi-core processors. A processor can include general purpose processors, central processing units (CPUs), specialized processors such as graphics processing units (GPUs), digital signal processors (DSPs), microcontrollers (MCUs), microprocessors, embedded controllers (ECs), embedded processors, field programmable gate arrays (FPGAs), network processors, application-specific instruction set processors (ASIPs), application-specific integrated circuit (ASIC) processors, co-processors, and the like. Additionally, a processor can be packaged in numerous configurations, which is not limiting. For example, a processor can be packaged in a common processor package, a multi-core processor package, a system-on-chip (SoC) package, a system-in-package (SiP) package, a system-on-package (SOP) package, and the like.

In an example, client system(s) 102 can send a message to a particular object node in the plurality of object nodes. In some examples, a message includes an object to be stored (e.g., a write operation) or information identifying a requested data object (e.g., a read operation). In some cases, the client system 102 can use a client application 104 associated with the distributed object store 120 to transmit the message.

In some examples, the client systems 102 can communicate with the cluster service 124 to obtain metadata about the distributed object store 120, which can include data describing where particular objects are stored in the plurality of object nodes 122. In addition, the cluster service 124 can store information about the state and workload distribution of the plurality of object nodes. Using this information, the cluster service 124 can send instructions to the one or more object nodes 122-1 to 122-N to redistribute the task assignments for one or more sub-tasks.

Figure 2:
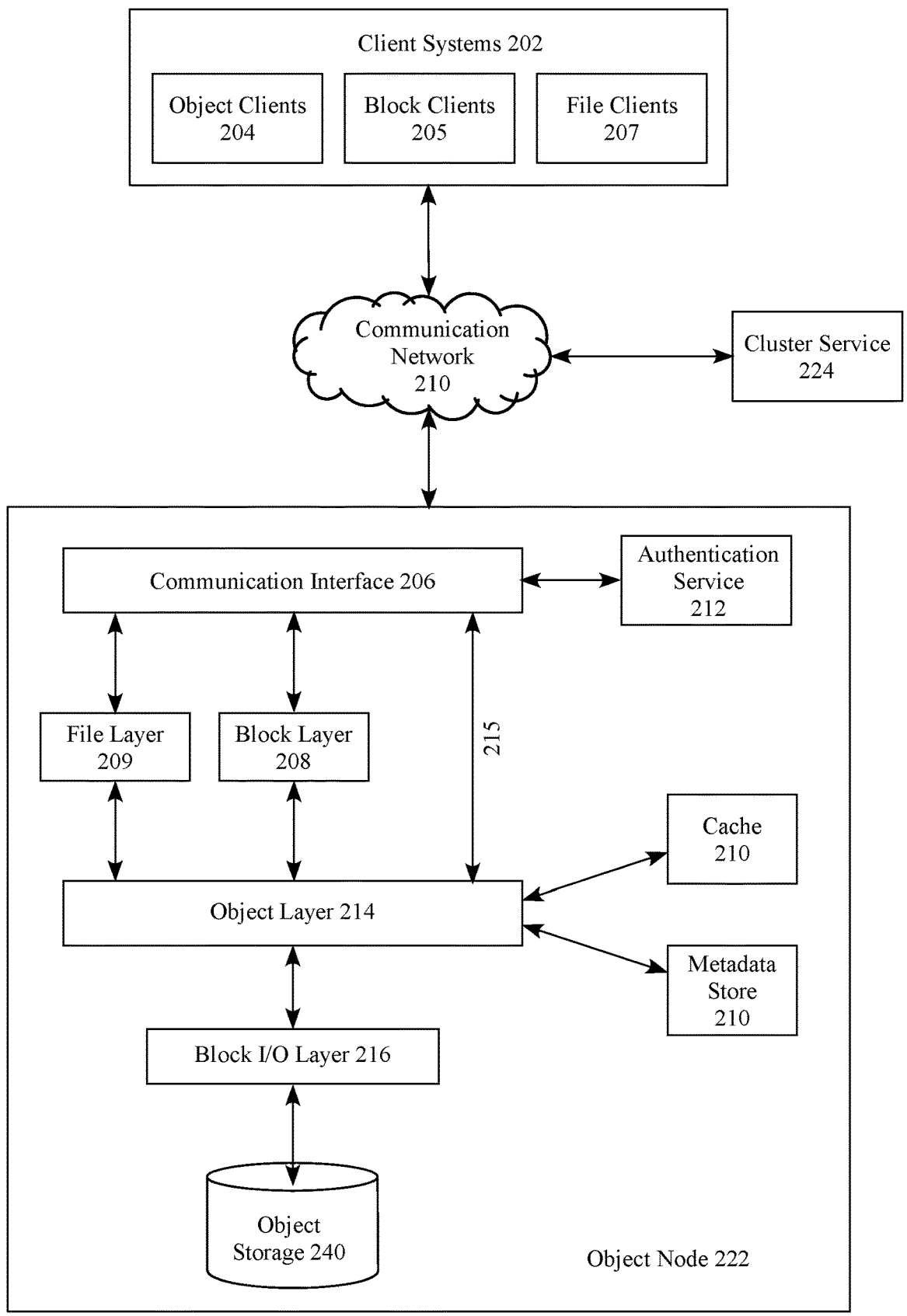
FIG. 2 illustrates an example distributed object store that includes a plurality of object nodes, a cluster service, and one or more client systems.

FIG. 2 illustrates an example distributed object store that includes a plurality of object nodes 222 (only one being actually shown), a cluster service 224, and one or more client systems 202. Similar to FIG. 1, one or more communication networks 210 interconnect these components. The communication networks 210 may be any of a variety of network types, including local area networks (LANs), wide area networks (WANs), wireless networks, wired networks, the Internet, personal area networks (PANs), or a combination of such networks.

In one example, client systems 202 can include various clients, including object clients 204, block clients 205, such as virtual machines, for example, and file clients 207. The client systems 202 can communicate with the object node 222 using a variety of communication protocols. For example, the object clients 204 can utilize an object messaging protocol of the distributed object store to send and receive messages from a particular object node. The object client 204 can use an object identifier to reference the particular object that is the object or target of a given message. In other examples, the block clients 205 can use a block access protocol to communicate messages to a given object node 222. In yet another example, the file clients can use file system protocols to communicate messages to the object node 222. The client systems 202 can additionally receive metadata related to the distributed object store (or cluster) that allows the client systems 202 to send messages to the distributed object store.

Additionally, the object node 222 can include a communication interface 206 (e.g., a network interface controller), an authentication service 212, a block layer 216, a file layer 209, a cache 210, a metadata store 212, and object storage 240. The communication interface 206 receives messages from the client system 202 (e.g., read or write requests), other object nodes in the distributed object store (e.g., administrative messages and so on) shown in FIG. 1, or the like. Similarly, the communication interface 206 may send messages in response to a client request (e.g., sending requested data, confirmations of a write, and so on) or to other object nodes (e.g., to create backup copies of an object).

In some examples, the communication interface 206 can access the authentication service 212 to authenticate a received message. In this way, only authorized parties can submit messages to the object node 222. The communication interface 206 then, depending on the source of the message, relays the message to the appropriate layer for processing the protocol of the message. Messages from different sources have different processing protocols that are converted to objects for subdividing into sub-tasks and processing in lockless mode. For example, virtual machines utilize a block protocol, and thus are block clients 205. In order for lockless object I/O processing to be performed for data requests from block clients 205, the data request (i.e., block data request) needs to be transformed into an object I/O request, which may include transforming block data for write requests into object data. In order to accomplish this, the communication interface 206 can send the block data request (and, in some cases, the block data) through the block layer 208 of the object layer 214, which converts the block data request to an object I/O request. In one example technique for this conversion, the block layer 208 can match the block data request to one or more objects stored at the object node 222. Similarly, messages from file clients 207 that utilize file system protocols (i.e., file data requests) need to be transformed into object I/O requests, which may include transforming file data for write requests into object data. In order to accomplish this, the communication interface 206 can send the file data request (and, in some cases, the file data) through the file layer 209 of the object layer 214, which converts the file data request to an object I/O request. Object I/O requests from object clients 204 can be passed directly 215 to the object layer 214.

It is noted that I/O requests can be serialized in order to avoid data integrity issues. Object clients 204, such as artificial intelligence (AI) clients for example, are independent of the operations of other objects because they store workload data as objects, and thus a specific serialization operation is not needed. For block clients 205 and file clients 207, any needed serialization can be enforced by the block layer 208 or the file layer 209, prior to sending object I/O requests along to the object layer 214.

Accordingly, depending on the originating client protocol, the object layer 214 can receive object I/O requests from the block layer 208, from the file layer 209, or directly from an object client 204. Each of the block and file layers use an appropriate protocol to communicate with the object layer 214, which in turn communicates with the block I/O layer 216 to facilitate storage (or retrieval) of the object or sub-object in the appropriate object storage device 240. In some examples, the block IO layer 216 uses asynchronous poll mode to initiate reads and writes to and from object storage device 240 (e.g., storage resource). Additionally, in some cases using asynchronous poll mode allows the system to avoid PCIe interrupt overhead. This function can be assigned (e.g., pinned) to specific cores to utilize drive bandwidth with the least number of cores.

In some examples, the metadata store 212 can store data (e.g., in 3D cross point-type persistent memory) to enable faster object to drive location mapping. Similarly, the cache 210 can store a portion of the data to enable faster retrieval or storage of data. In some examples, the cluster service (e.g., 124 in FIG. 1) stores data describing where particular object are stored and what the current workload of one or more object nodes is currently.

Figure 3:
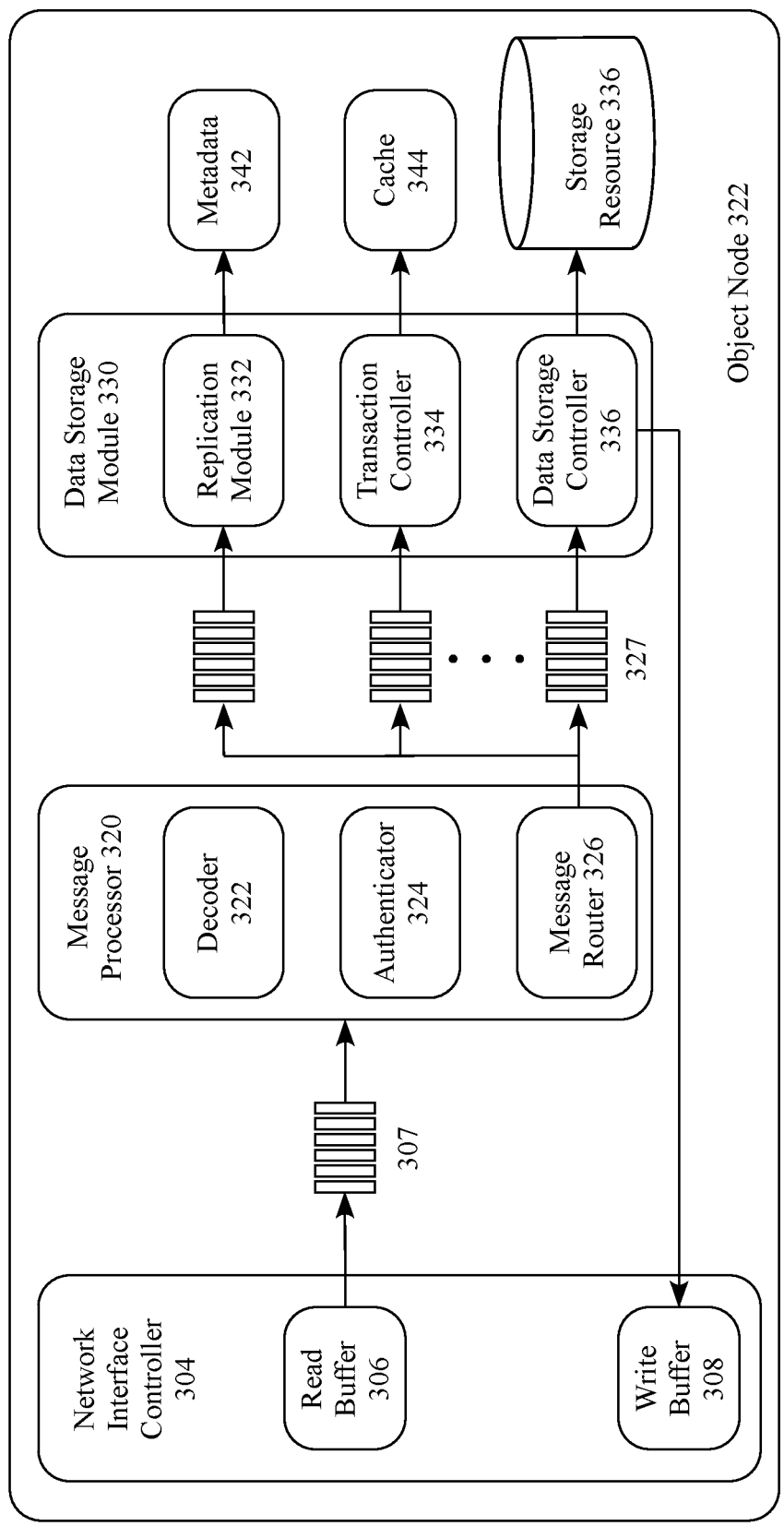
FIG. 3 is a block diagram illustrating an example object node.

FIG. 3 is a block diagram illustrating an example object node 322, which is one of a plurality of object nodes 322 included in a distributed object store. The example object node 322 can include a network interface controller (NIC) 304, a message processor 320, one or more data storage modules 330, a cache 344, a metadata store 342, and a storage resource 336. In some examples, the object node includes a plurality of processing cores, each processing core at least temporarily allocated to perform one of a group of tasks. For example, a given processing core can be allocated to perform tasks associated with a network interface controller 304, a message processor 320, or a data storage module 330. The allocation of processing cores can be adjusted to spread workload and prevent hotspots and/or starvation.

In some examples, a core sub-task type assignment unit initializes sub-task assignments to individual cores before messages are received. In this way, each sub-task is pre-assigned to a particular core when the first message is received. These core assignments can be dynamically updated based on system loads to ensure proper allocation of the task assignments.

The object node 322 includes one or more internal communication lines (e.g., a bus) that allows the components to communicate with each other. The network interface controller 304 can store incoming communications (e.g., messages) in a read buffer 306. In some examples, responses to received communications (e.g., requested data or confirmations) can be stored in a write buffer 308 for return to the originating client application. Messages, or other data requests, are read out of the read buffer 306 and placed in a message queue 307. It should be noted that while the NIC 304 and other components are depicted as separate components, in some examples, the NIC 304 can include one or more units that perform the tasks associated with the other components.

A message processor 320 can read messages from the message queue 307, and can include a decoder 322, an authenticator 324, and a message router 326. The decoder 322 can access a message and identify relevant information about the message. For example, the decoder 322 can identify a task type of the message. Task types can include, but are not limited to, network management messages, input/output messages (e.g., read requests or write requests), and internode messages.

In some examples, the decoder 322 can use a portion of the message (also called header or metadata) to potentially place the data into the cache 344 using temporal data hints. The rest of the message can be treated as non-temporal data to avoid cache pollution (e.g., non-temporal data is data that is not repeatedly accessed and thus is inefficient data to store in cache).

The authenticator 324 can ensure the authenticity of a given message before transferring it to the message router 326. The message router 326 can classify the priority of the message and assign the message into an appropriate priority queue. In some examples, the message router 326 assigns messages to particular cores based, at least in part, on the task type for each message. For example, critical system maintenance messages can be placed in a high priority queue to ensure quick processing. Less important message types can be placed in another message queue and the system can allocate processing time to the queue based on a number of factors.

In addition, when processing input/output messages, the message router 326 can use consistent hashing techniques to ensure that messages associated with certain objects are correctly distributed. Hashing is also an important component in achieving data distribution by using any of the well-known consistency hashing techniques (e.g., Controlled Replication under Scalable Hashing (CRUSH), Ring based hashing, highest random weight hashing, and so on.)) Using consistent hashing techniques, objects (including sub-objects) can be divided into sub-objects having associated sub-tasks and spread over a plurality of storage resources preassigned according to sub-task/object type. In some examples, the message router 326 creates a hash from an object identifier associated with each object or sub-object. A section of the hash value can be used as an index to a lookup table (e.g., the last 8 bytes or some other portion). The lookup table identifies which storage resource is assigned to store the sub-object associated with the sub-task, as well as the corresponding processing core that is associated with that storage resource.

In another example, a message can include a system maintenance task. In this case, the relevant portion of the system can enter a lock mode and the message router 326 can assign these messages to one or more cores for execution. In other words, when performing a non-client I/O task, one or more cores can be instructed to override the preassigned association with a storage resource to assist in processing the non-client I/O task, which will likely involve a lock-mode execution, assuming multiple cores are accessing the same storage resource. Once the non-client I/O task has been completed, the core can return to the pre-assigned storage resource, once again in lockless mode.

The message router 326 can place messages in object I/O queues 327 based on sub-task type, in some cases according to a generated hash value for the sub-tasks. In some examples, the specific I/O queue selected is based on which storage resources and processing cores have been pre-assigned to perform particular sub-tasks associated with storing and/or retrieving object data. In some examples, the processing cores include a listener application that periodically polls one or more queues. When a listener application determines that a task to which its associated core has been pre-assigned is in a queue, the listener application accesses the queue to retrieve the task. In some examples, each processing core can be associated with a particular queue. In other examples, a group of processing cores can poll one common queue for tasks that are specific to each particular core.

In some examples, the data storage module 330 include cores that are each assigned a single storage resource. Thus, when an object or sub-object stored at the single storage resource is accessed in response to a message (or a particular sub-task from a message), only a single processing core can interact with that storage resource. In this way, the object node 202 can stay in lockless mode when performing data input/output tasks. The replication module 332 can ensure that the local copy of a given object is successfully stored, and that additional copies are saved on other object nodes in the cluster. A variety of data protection techniques can be used, including but not limited to, erasure coding, replica-based protection, or the like.

The transaction controller 334 can be responsible for serializing I/O for block workloads originating from virtual machines on client systems. This includes maintaining metadata for the objects/sub-objects, managing free lists on the drive, scrubbing/patrolling for corruptions, patching such corruptions, managing the cache, and the like. In some examples, data storage controller 336 can be responsible for storing sub-object data to, and retrieving sub-object data from, the storage resource 336 via specific cores assigned to sub-tasks associated with each sub-object. Thus, because each storage resource is only accessible by a single core when performing object I/O operations, data locking is unnecessary.

Figure 4A:
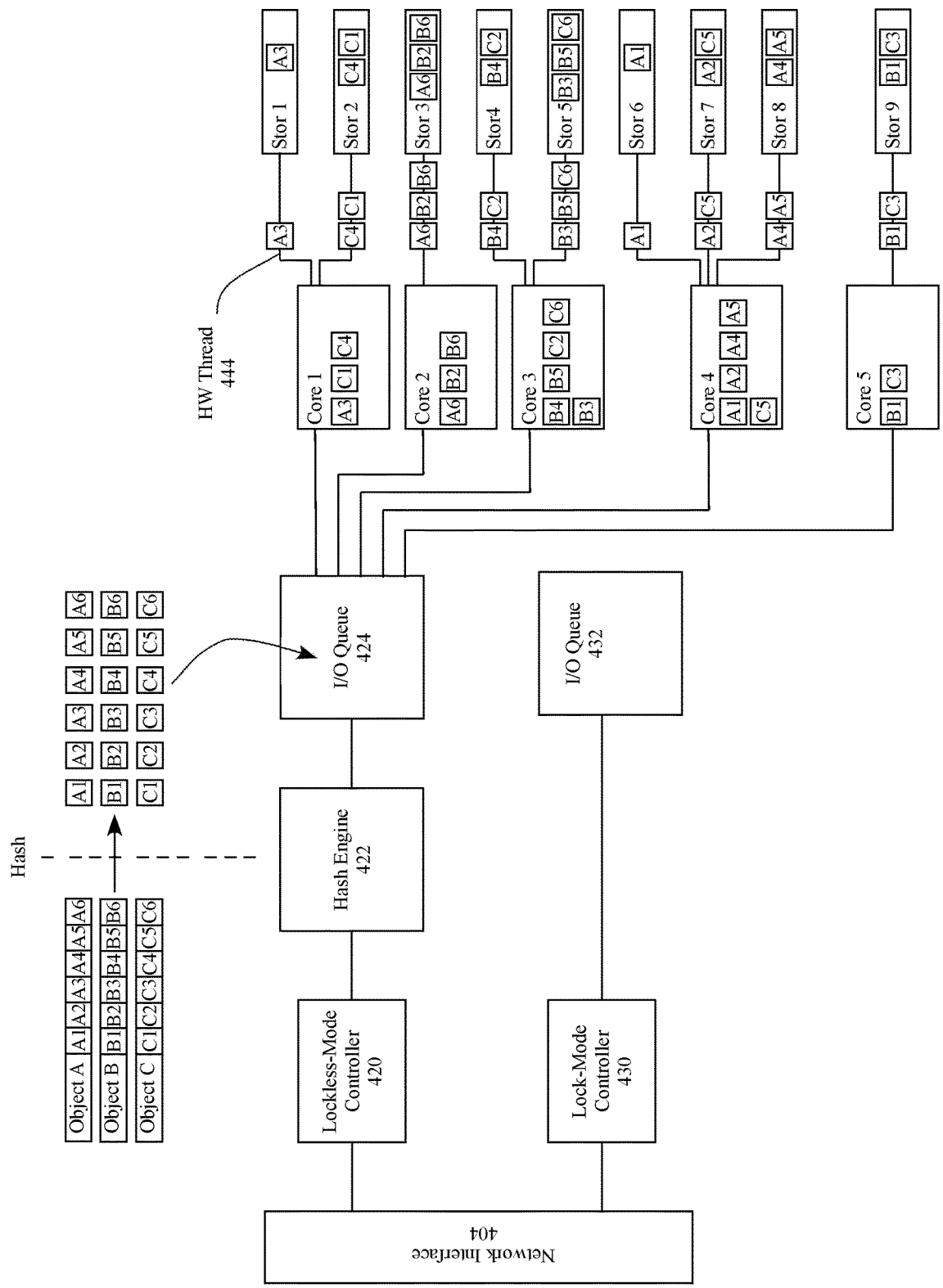
FIG. 4A illustrates an example of an object node in lockless-mode object I/O.
Figure 4B:
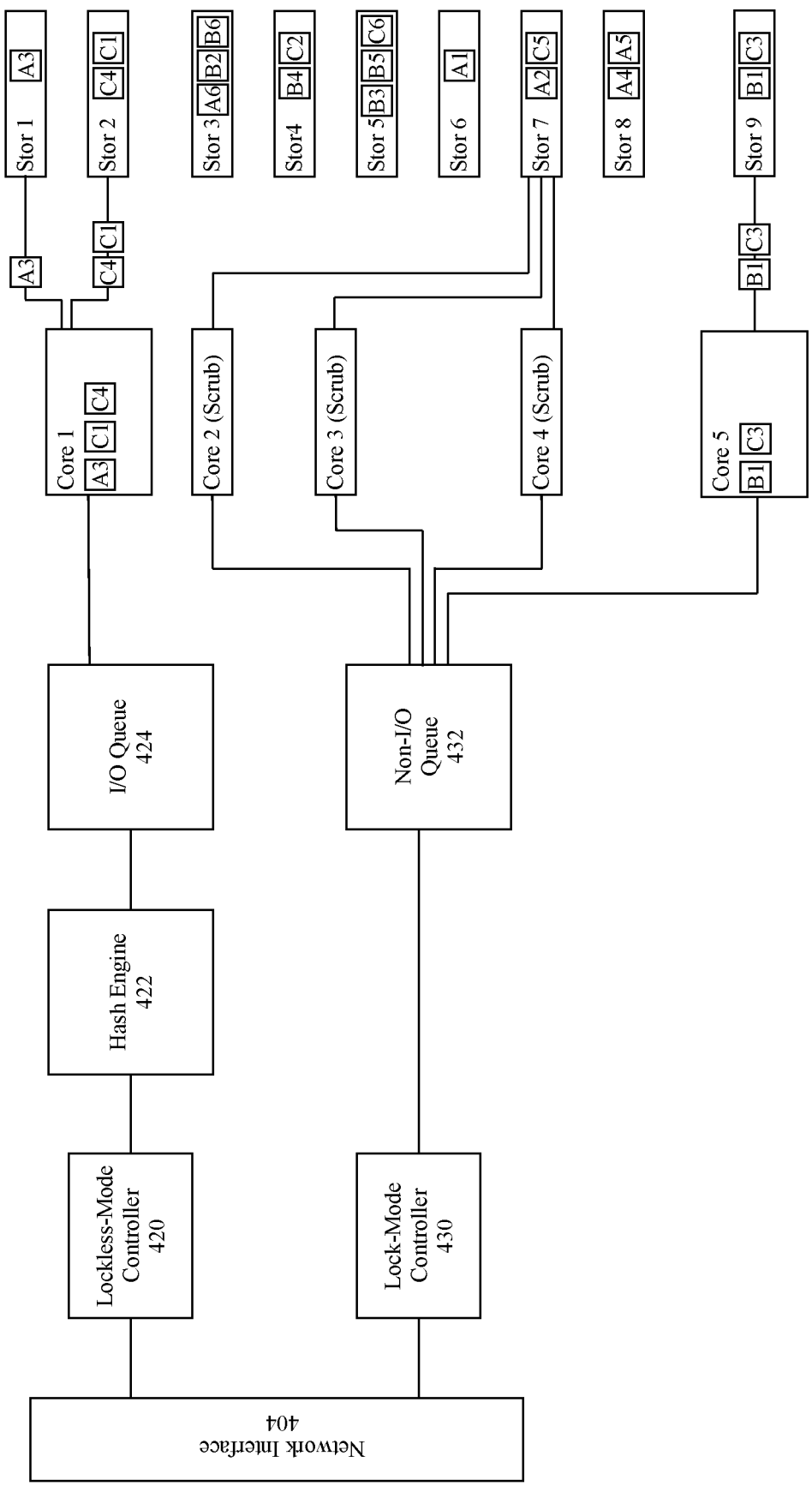
FIG. 4B illustrates an example of an object node in lock-mode processing.

FIG. 4A is an example showing an object node operating in a lockless mode and FIG. 4B is an example showing the object node operating in a lock mode. In this example, a network interface 404 receives messages over a network, where such messages can originate from client systems outside of the distributed object store, from other object nodes within the distributed object store, from a cluster service that is included in the distributed object store, or the like. In some examples, the network interface 404 analyzes an incoming message to identify whether it is an object I/O message, an administrative message, or the like. In accordance with a determination that the message is an object I/O message, the network interface transmits the message to the lockless mode controller 420.

The lockless mode controller 420 can processes messages relating to the storage and retrieval of sub-objects for storage resources under the control of the lockless mode controller 420, which in the example of FIG. 4A are storage resources Stor 1-9. Objects A, B, and C are shown at the top of FIG. 4A, with Object A including sub-objects A1-A6, Object B including sub-objects B1-B6, and Object C including sub-objects C1-C6.

The lockless-mode controller 420 sends the object I/O tasks to hash engine 422, where the associated objects are divided into sub-objects, each corresponding to a particular sub-task of the associated object. It is noted that the functionalities of the lockless-mode controller 420 and the hash engine 422 can be implemented as distinct hardware elements or they can be incorporated into a single hardware element. Additionally, in some cases the lockless-mode controller 420, either alone or in combination with the hash engine 422, can correspond to the message router 326 of FIG. 3. The hash engine 422 can thus generate a hash value for each object or sub-object by using consistent hashing techniques, as described herein. In some examples, the hash value can be generated by hashing the entire sub-object. In other examples, the hash value can be generated by hashing an identifier associated with the sub-object. In the example shown in FIG. 4A, Objects A, B, and C are shown hashed into a plurality of sub-A1-A6, B1-B6, and C1-C6. Using the generated hash values, the lockless mode controller 420 can use a look-up table to send the sub-tasks associated with each sub-object (and in some cases with the associated sub-object) to an appropriate I/O queue 424. In this example, only a single I/O queue 424 is represented. In other examples, each processing core can have a corresponding queue, or one or more processing cores can share a common queue.

FIG. 4A shows a plurality of processing cores labeled as Core 1-5, which in some cases can each include a listening application to poll the I/O queue 424 for sub-tasks that have been preassigned to a particular storage resource (Stor 1-9) that is uniquely associated with a single core (i.e., each storage resource receives hardware threads from only one core). While each storage resource Stor 1-9 is uniquely associated with a single core, each core can be associated with one or more storage resources. Stor 3, for example, is uniquely associated with Core 2, and Core 2 is only associated with Stor 3. Stor 1 is uniquely associated with Core 1; however in this case Core 1 is associated with Stor 1 and Stor 2. As such, data locking is not dependent on the number of storage resources to which a given core is assigned, but rather is dependent on the number of cores to which a storage resource is assigned; if the number of cores assigned to a given storage resource is greater than one, then locking mechanisms will be needed to conserve sub-object coherence. Additionally, one or more sub-objects can be assigned to each storage resource, which is illustrated by the sub-objects of Objects A-C shown sorted through Cores 1-5 into Stor 1-9. As specific examples, Core 1 stores sub-object A3 in Stor 1 and sub-objects C1 and C4 in Stor 2, while Core 2 stores sub-objects A6, B2, and B6 in Stor 3. The various cores receive the sub-tasks associated with the various sub-objects from the I/O queue 424, generate hardware threads 444 specific to the proper storage resource, and proceed to perform the appropriate object operation. It is noted that, in some implementations, multiple copies of an object can be stored in the same object node. In such cases, sub-objects copies can be stored on different memory resources.

FIG. 4B shows an example of an object node as shown in FIG. 4A operating in both a lockless mode and a lock mode. In this example, a network interface 404 receives messages over a network, which, as noted above, can originate from client systems outside of the distributed object store, from other object nodes within the distributed object store, from a cluster service that is included in the distributed object store, or the like. The network interface 404 analyzes an incoming message to identify whether it is an object I/O message or a non-object I/O message (e.g., background scrubbing message). In accordance with a determination that the message is a non-object I/O message, the network interface transmits the message to the lock controller 430.

The lock controller can 430 analyze the message to determine the nature of the requested task. For example, the message can request system maintenance on a particular storage resource. For non-object I/O tasks that require significant processing resources, such as a data scrubbing operation for example, the lock controller 430 can allocate and re-assign one or more processing cores to assist in performing the task. In some examples, a priority scheme can be used to determine which processing cores to allocate to the task. In other examples, a group of cores is pre-assigned to perform particular system maintenance tasks when they arise. In yet other examples, a distinct set of cores can be dedicated to performing only such tasks. The lock controller 430 can then place the message in the non-I/O queue 432.

The assignment of processing cores utilized to perform a non-IO task can be accomplished according to various techniques. In one implementation, for example, a controller, such as the lock controller 430, can temporarily assign one or more cores performing object-I/O operations to the non-I/O task. In another implementation, one or more cores can include a listening application that polls the non-I/O queue for non-I/O tasks. Regardless of the origination, FIG. 4B shows the temporary reassignment of Cores 2, 3, and 4 to perform a non-I/O task at Mem 7, while Cores 1 and 5 continue to process object I/O messages. Performance of the non-I/O task (e.g., Scrub) at Stor 7 is thus shared between Cores 2, 3, and 4 in order to minimize the downtime that would otherwise occur with only Core 4 performing the task. Given that more than one processing core will be accessing Mem7, lock mode operations allow for data locking if portions of the memory of Mem 7 are accessed simultaneously by multiple cores. Once the task associated with the non-I/O task has been performed, processing Cores 2, 3, and 4 are assigned back to their original object I/O assignments. As such, the system can dynamically switch from one mode to the other in response to message priority, workload distribution, and the like.

Figure 5:
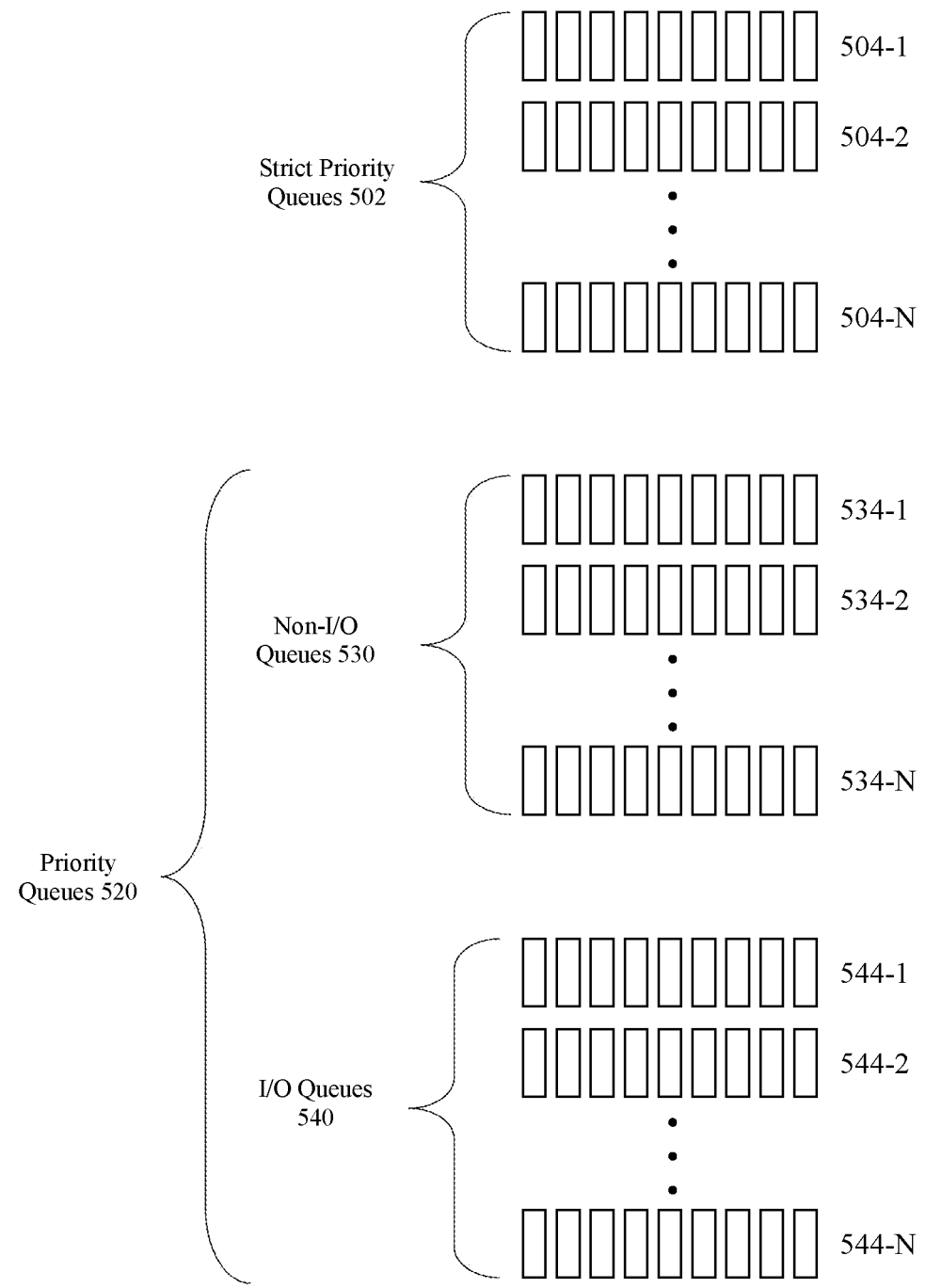
FIG. 5 is a diagram illustrating example message queues, including one or more strict priority queues and one or more priority queues.

FIG. 5 is a diagram illustrating one technique for prioritizing messages in an object storage node to efficiently process messages and avoid resource starvation. In this example, message queues include strict priority queues 502 and priority queues 520. Incoming messages have an associated message type that is used to identify the nature and/or priority of the task associated with the message. Once identified, the task is placed in the proper queue. Strict priority messages/tasks are generally time sensitive, such as a notice of system shutdown or a critical fail event in the cluster. In such cases, a portion or even all cores may need to prioritize a strict priority message higher than other queues.

In other examples, processing cores can be reallocated to perform system tasks and internode messages tasks as needed, similar to the reallocation shown in FIG. 4B, for example. Such tasks can include, without limitation, memory resource status queries, memory resource performance statistics, scrubbing tasks, and the like. Such tasks should be prioritized using fair scheduling to avoid starvation. In this way, non-I/O messages can be processed while the object node or a portion of the object node is in the locked mode. Thus, it is contemplated that a portion of an object node can be performing object-I/O operations in lockless mode while another portion of the object node is performing non-I/O operations in lock mode. Additionally, some tasks may start off as high priority tasks, but may have their priority downgraded if they are consuming significant amounts of compute-I/O bandwidth. For example, a task that needs 1 terabyte of data can starve small I/O tasks that are pending in a queue. The 1 terabyte task can be throttled by pushing the task to a lower point in the priority queue.

As described above, in some examples the strict priority queues 502 can include system messages such as, without limitation, shutdown messages (that may need real-time responses to facilitate a graceful exit), certain administrator messages, and other messages that may need near real-time responses. Due to the high priority of such messages, strict priority queues 504-1 to 504-N are generally not subjected to throttling, and are processed before any other queue, in some cases in the order that they were received (e.g., first-in-first-out (FIFO)). In some examples, a poll mode loop running on each core looks for messages arriving in the strict priority queue to see if existing work needs to be interrupted. In this way, the strict priority queues 502 can be processed quickly.

The priority queues 520 can include both non-I/O queues 530 and I/O queues 540. Non-I/O queues 530 can include, for example, control plane messages, cluster management operation messages, and the like. In some cases, the non-I/O queues 530 can include data distribution acknowledgements from object nodes in the distributed object storage system. As described for the strict priority queues 502, messages in the non-I/O queues 530 can be subjected to an arbitration scheme such as by a weighted round robin scheduler, for example. Thus, messages in each of the non-I/O queues 534-1 to 534-N can be processed based on a weight assigned to each non-I/O queue, which can be based on the relative importance of the message types in the queue, such that more important message types have more weight (and are thus more frequently executed) than less important message types.

The I/O queues 540 include messages that are associated with I/O operations (e.g. reading object data from, or storing object data to, a data storage medium). In some examples, messages in an IO queue (544-1 to 544-N) can be subjected to an arbitration scheme such as a deficit weighted round robin algorithm, for example, that provides reasonable fairness over a period of time without significant processing overhead.

In many cases, queues have a certain number of messages that can be processed in a given period of time (an iteration). The number of messages that can be processed can be described as a budget for the given time period. Queues are allotted a certain portion of the budget to process messages stored therein. In some examples, the strict priority queues 502 can be allocated enough budget to complete all messages stored in strict priority queues 504-1 to 504-N, with the remaining budget being allocated to the priority queues 520. Because the I/O queues 540 tend to be messages with the lowest priority, the I/O queue budget can be allocated after the budget for the non-I/O queues has been determined. In addition, the average speed of an I/O transaction can be estimated to provide a more accurate allocation of the budget. In another example, in order to avoid a per I/O transaction cost estimation penalty, a portion of the messages can be de-queued and processed to establish an actual I/O cost that can be used to calculate a more accurate distribution of the remaining budget. In accordance with a determination that the budgeted queue quote has been exceeded (e.g., due to an estimation problem, for example) the misallocation can be adjusted in the next cycle.

Figure 6:
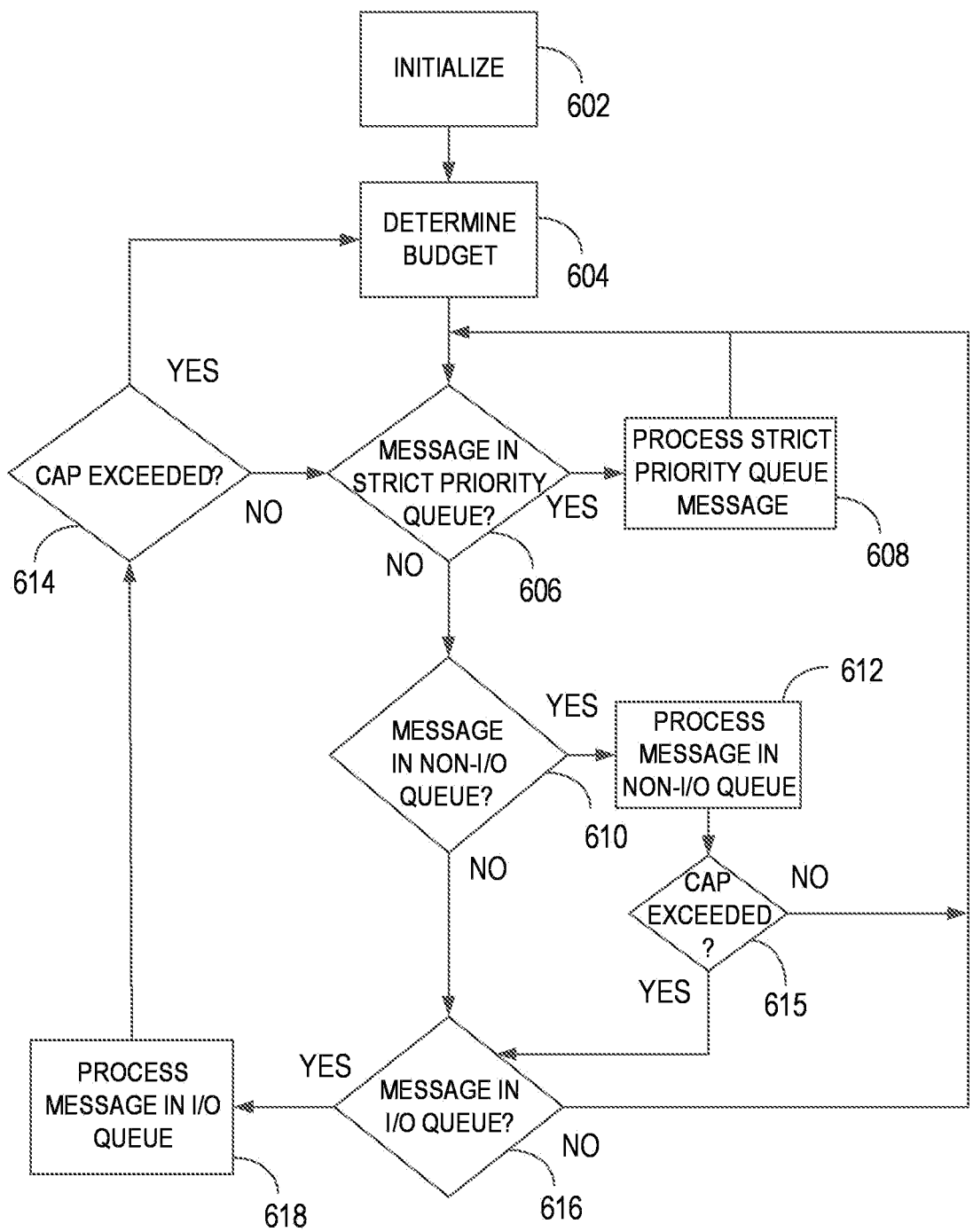
FIG. 6 is a flowchart illustrating example operations for processing messages (e.g., tasks) in a plurality of queues with distinct priorities.

FIG. 6 provides a flowchart illustrating example operations for processing messages (e.g., tasks) in a plurality of queues with distinct priorities. In this example, a task scheduler initializes (602) a queue system (e.g., the system of FIG. 4A). Initializing the queue system can include determining the specific characteristics of the device (e.g., information concerning the size of memory transactions the device can perform, the number of memory transactions that the device can perform in a particular time frame, the difference between read and write transactions, if any, and the difference between sequential memory transactions and random memory transactions, if any). The task scheduler can also determine any existing system preferences (e.g., the maximum number of different operation types). The task scheduler (604) determines a budget that includes a maximum input/output operation for a particular period of time, which can include a maximum number of operations that can be calculated for each queue, for each queue type, and for each device in the object node.

The task scheduler can determine (606) whether there is a message in the strict priority queue. In accordance with a determination that there is a message in the strict priority queue, the task scheduler can schedule the message at an assigned core, which in turn processes (608) the message in the strict priority queue. Once the message has been processed, the task scheduler can determine (606) whether there is another message in the strict priority queue. In some examples, the strict priority queue can be emptied before any other queues are accessed.

In accordance with a determination that there are no messages remaining in the strict priority queue, the task scheduler determines (610) whether there is at least one message in a non-I/O queue. In accordance with a determination that at least one message is currently in a non-I/O queue, the task scheduler can cause the message to be processed (612) by the appropriate core. When the message has been processed, the task scheduler can determine (615) whether the number of messages processed from the non-I/O queues has exceeded the predetermined cap or budget. If the budget for non-IO messages has been exceeded, the task scheduler can determine (616) whether there are messages in the I/O queue. In this manner, at least some lower priority I/O messages will still be processed if there are still messages in higher priority queues. The budget can be adjusted to determine an acceptable ratio of higher importance tasks to lower importance tasks. It should be noted that messages in the strict priority queue are generally of sufficient importance to justify processing all of such messages before lower priority messages are processed. In some cases, however, the arbitration scheme can also be extended to include scheduling strict priority messages, or at least some strict priority messages, amongst the lower priority messages.

In accordance with a determination (615) that the cap for non-I/O queues has not been reached, the task scheduler can initially determine whether there are messages in the strict priority queue (606) before determining whether there are messages remaining in a non-I/O queue. In response to a determination (610) that there are no messages remaining in a non-I/O queue, the task scheduler determines (616) whether there are messages in an I/O queue. If not, the task scheduler returns to checking whether the static priority queue includes one or more messages (606). In response to a determination that there is a message in an I/O queue, the task scheduler processes (618) the I/O message. The task scheduler then determines (614) whether the cap of I/O queue messages has been reached. If so, the task scheduler again (604) determines the budget. If not, the task scheduler determines (606) whether there are messages in the strict priority queue and then (610) the non-I/O queue. If no messages are present in these queues, the task scheduler can determine again whether there are messages in the I/O queue.

Figure 7:
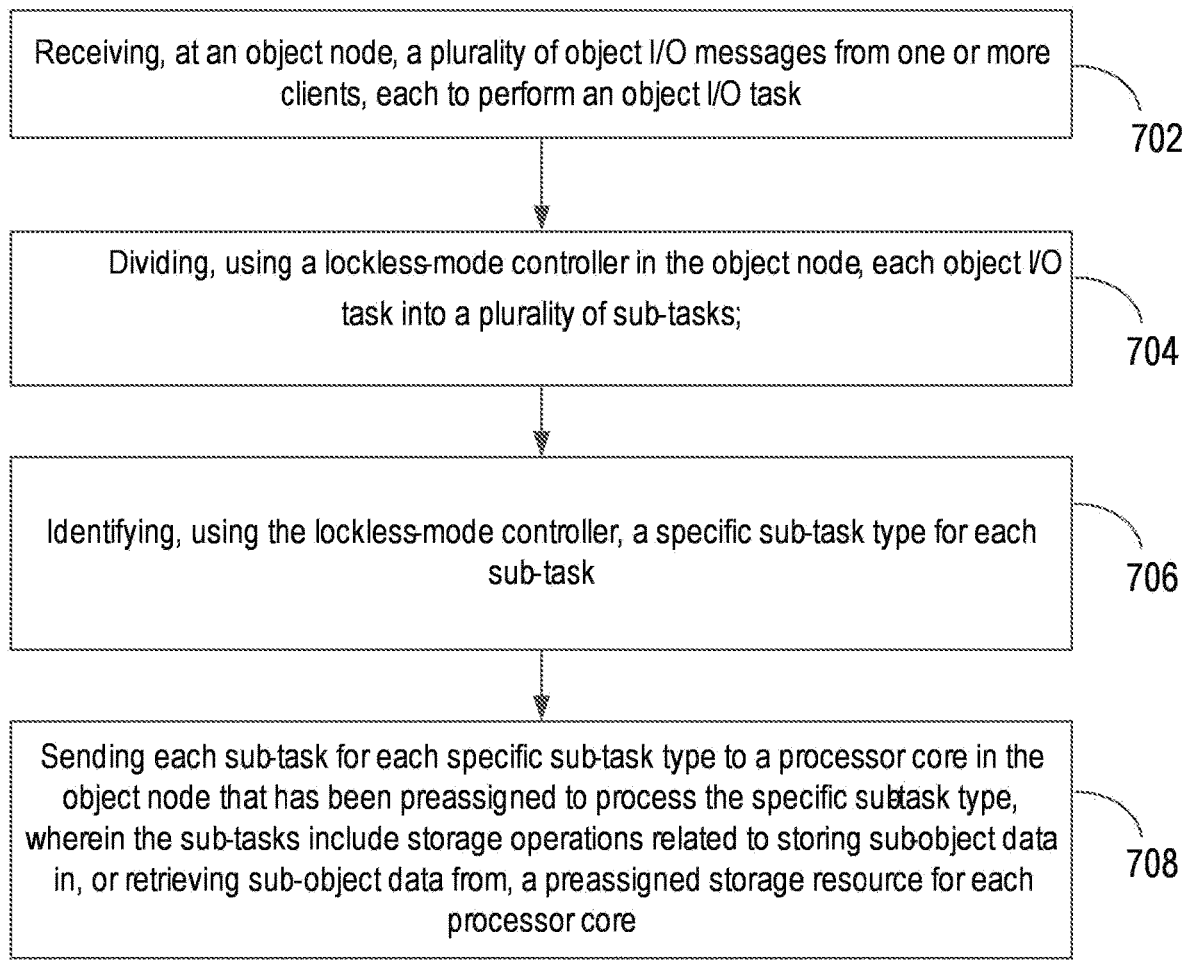
FIG. 7 is a flowchart illustrating example operations for storing object data in a lockless data plane with high performance and low latency at an object node in a distributed object store.

FIG. 7 provides a flowchart illustrating example operations for performing object I/O operations at an object node of a distributed object store in a lockless manner with high performance and low latency. In one example, such a method can include receiving (702), at an object node, a plurality of object I/O messages from one or more clients, each to perform an object I/O task, dividing (704), using a lockless-mode controller in the object node, each object I/O task into a plurality of sub-tasks, identifying (706), using the lockless-mode controller, a specific sub-task type for each sub-task, and sending (708) each sub-task for each specific sub-task type to a processor core in the object node that has been preassigned to process the specific sub-task type, wherein the sub-tasks include storage operations related to storing sub-object data in, or retrieving sub-object data from, a preassigned storage resource for each processor core.

Various techniques, or certain aspects or portions thereof, can take the form of program code (i.e., instructions) embodied in tangible media, such as CD-ROMs, hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device can include a processor, a storage medium readable by the processor (including volatile and non-volatile memory and/or storage elements), at least one input device, and at least one output device. The volatile and non-volatile memory and/or storage elements can be a RAM, EPROM, flash drive, optical drive, magnetic hard drive, solid state drive, or other medium for storing electronic data. The node and wireless device can also include a transceiver module, a counter module, a processing module, and/or a clock module or timer module. One or more programs that can implement or utilize the various techniques described herein can use an application programming interface (API), reusable controls, and the like. Such programs can be implemented in a high level procedural or object oriented programming language to communicate with a computer system. However, the program(s) can be implemented in assembly or machine language, if desired. In any case, the language can be a compiled or interpreted language, and combined with hardware implementations. Exemplary systems or devices can include without limitation, laptop computers, tablet computers, desktop computers, smart phones, computer terminals and servers, storage databases, and other electronics which utilize circuitry and programmable memory, such as household appliances, smart televisions, digital video disc (DVD) players, heating, ventilating, and air conditioning (HVAC) controllers, light switches, and the like.

EXAMPLES

The following examples pertain to specific example embodiments and point out specific features, elements, or steps that can be used or otherwise combined in achieving such embodiments.

In one example, there is provided an object node apparatus comprising a lockless-mode controller configured to communicatively couple to a plurality of storage resources and to a plurality of processor cores each preassigned to process a specific type of sub-task at a different preassigned storage resource that is configured to receive object input/output (I/O) only from the preassigned core. The lockless-mode controller is further configured to receive a plurality of object I/O messages from one or more clients, each to perform an object I/O task, divide each object I/O task into a plurality of sub-tasks, identify a specific sub-task type for each sub-task, and send each sub-task for each specific sub-task type to a preassigned storage resource through a specific processor core preassigned to the storage resource for processing the specific sub-task type in a lock-less mode, wherein the sub-tasks include storage operations related to storing sub-object data in, or retrieving sub-object data from, the preassigned storage resource for each processor core.

In one example apparatus, to send each sub-task for each specific sub-task type to a processor core preassigned to process the specific sub-task type, the lockless-mode controller is further configured to send each sub-task to a sub-task-specific I/O queue.

In one example apparatus, the sub-task-specific I/O queue serves tasks to multiple processor cores that have been preassigned for the specific sub-task type of the sub-task-specific I/O queue.

In one example apparatus, the sub-task-specific I/O queue serves tasks to a single processor core that has been preassigned for the specific sub-task type of the sub-task-specific I/O queue.

In one example apparatus, to send each sub-task for each specific sub-task type to a processor core preassigned to process the specific sub-task type, the lockless-mode controller is further configured to send each sub-task to a common queue.

In one example apparatus, each processor core preassigned to process the specific sub-task type further comprises a listen unit configured to listen for a sub-task on the common queue having a specific sub-task type matching the preassigned specific sub-task type of the associated processor core and retrieve the sub-task from the common queue.

In one example apparatus, the one or more clients are external to the object node apparatus.

In one example apparatus, the one or more clients includes a processor core within the object node apparatus.

In one example apparatus, the one or more clients includes at least one of the plurality of processor cores.

In one example, the apparatus further comprises a hash engine communicatively coupled to the lockless-mode controller, wherein, to divide each object I/O task into the plurality of sub-tasks, the hash engine is configured to generate a hash value for each sub-task using a consistent hashing technique, and use at least a portion of the hash value to identify, in a lookup table, a processor core for each sub-task.

In one example apparatus, the hash value is calculated using an identifier for a sub-object associated with the sub-task.

In one example, the apparatus further comprises a lock-mode controller communicatively coupled to the plurality of processor cores and configured to receive a non-I/O message to perform a non-I/O task, determine that the non-I/O task requires processing at a storage resource that is above a processing threshold sufficient to slow object I/O performance, send the non-I/O task to the storage resource through the processor core preassigned to the storage resource, select a different processor core processing object I/O sub-tasks at a different memory resource to which the different processor was preassigned, reallocate the different processor to the storage resource to co-process the non-I/O task with the processor core in a lock-mode, and reallocate the different processor back to the different memory resource to resume object I/O sub-task processing.

In one example, there is provided an object node in a distributed object store system, the object node comprising a plurality of processor cores each preassigned to process a specific type of sub-task at a different preassigned storage resource, wherein each preassigned storage resource is configured to receive object input/output (I/O) only from a single preassigned core, and a lockless-mode controller communicatively coupled to the plurality of processor cores and configured to communicatively couple to a plurality of storage resources. The lockless-mode controller is further configured to receive a plurality of object I/O messages from one or more clients, each to perform an object I/O task, divide each object I/O task into a plurality of sub-tasks, identify a specific sub-task type for each sub-task, and send each sub-task for each specific sub-task type to a preassigned storage resource through a specific processor core preassigned to the storage resource for processing the specific sub-task type, wherein the sub-tasks include storage operations related to storing sub-object data in, or retrieving sub-object data from, the preassigned storage resource for each processor core.

In one example object node, the lockless-mode controller further comprises a message decoder configured to decode the object I/O messages to identify the object I/O task for each object I/O message and a message router configured to send each sub-task for each specific sub-task type to a processor core preassigned to process the specific sub-task type.

In one example object node, to send each sub-task for each specific sub-task type to a processor core preassigned to process the specific sub-task type, the lockless-mode controller is further configured to send each sub-task to a sub-task-specific I/O queue.

In one example object node, the sub-task-specific I/O queue serves tasks to multiple processor cores that have been preassigned for the specific sub-task type of the sub-task-specific I/O queue.

In one example object node, the sub-task-specific I/O queue serves tasks to a single processor core that has been preassigned for the specific sub-task type of the sub-task-specific I/O queue.

In one example object node, to send each sub-task for each specific sub-task type to a processor core preassigned to process the specific sub-task type, the lockless-mode controller is further configured to send each sub-task to a common queue.

In one example object node, each processor core preassigned to process each specific sub-task type further comprises a listen unit configured to listen for a sub-task on the common queue having a specific sub-task type matching the preassigned specific sub-task type of the associated processor core and retrieve the sub-task from the common queue.

In one example object node, the one or more clients are external to the object node apparatus.

In one example object node, the one or more clients includes a processor core within the object node apparatus.

In one example object node, the one or more clients includes at least one of the plurality of processor cores.

In one example, the object node further comprises a hash engine communicatively coupled to the lockless-mode controller, wherein, to divide each object I/O task into the plurality of sub-tasks, the hash engine is configured to generate a hash value for each sub-task using a consistent hashing technique and use at least a portion of the hash value to identify, in a lookup table, a processor core for each sub-task.

In one example object node, the hash value is calculated using an identifier for a sub-object associated with the sub-task.

In one example, the object node further comprises a lock-mode controller communicatively coupled to the plurality of processor cores and configured to receive a non-I/O message to perform a non-I/O task, determine that the non-I/O task requires processing at a storage resource that is above a processing threshold sufficient to slow object I/O performance, send the non-I/O task to the storage resource through the processor core preassigned to the storage resource, select a different processor core processing object I/O sub-tasks at a different memory resource to which the different processor was preassigned, reallocate the different processor to the storage resource to co-process the non-I/O task with the processor core in a lock-mode, and reallocate the different processor back to the different memory resource to resume object I/O sub-task processing.

In one example, there is provided a method for storing object data in a distributed object store, comprising receiving, at an object node, a plurality of object I/O messages from one or more clients, each to perform an object I/O task, dividing, using a lockless-mode controller in the object node, each object I/O task into a plurality of sub-tasks, identifying, using the lockless-mode controller, a specific sub-task type for each sub-task, and sending each sub-task for each specific sub-task type to a preassigned storage resource in the object node through a specific processor core in the object node preassigned to the storage resource for processing the specific sub-task type, wherein the sub-tasks include storage operations related to storing sub-object data in, or retrieving sub-object data from, a preassigned storage resource for each processor core.

In one example method, sending each sub-task for each specific sub-task type to a processor core in the object node that has been preassigned to process the specific sub-task type further comprises sending each sub-task to a sub-task-specific I/O queue.

In one example method, the sub-task-specific I/O queue serves tasks to multiple processor cores that have been preassigned for the specific sub-task type of the sub-task-specific I/O queue.

In one example method, the sub-task-specific I/O queue serves tasks to a single processor core that has been preassigned for the specific sub-task type of the sub-task-specific I/O queue.

In one example method, in sending each sub-task for each specific sub-task type to a processor core preassigned to process the specific sub-task type, the method further comprises, using the lockless-mode controller, sending each sub-task to a common queue.

In one example, the method further comprises listening for a sub-task on the common queue having a specific sub-task type matching the preassigned specific sub-task type of the associated processor core and retrieving the sub-task from the common queue.

In one example method, to divide each object I/O task into the plurality of sub-tasks, the method further comprises generating a hash value for each sub-task using a consistent hashing technique and using at least a portion of the hash value to identify, in a lookup table, a processor core for each sub-task.

In one example method, the hash value is calculated using a name of an object associated with the task.

In one example, the method further comprises receiving, at a lock-mode controller, a non-I/O message to perform a non-I/O task, determining that the non-I/O task requires processing at a storage resource that is above a processing threshold sufficient to slow object I/O performance, sending the non-I/O task to the storage resource through the processor core preassigned to the storage resource, selecting a different processor core processing object I/O sub-tasks at a different memory resource to which the different processor was preassigned, reallocating the different processor to the storage resource to co-process the non-I/O task with the processor core in a lock-mode, and reallocating the different processor back to the different memory resource to resume object I/O sub-task processing.

While the forgoing examples are illustrative of the principles of example embodiments in one or more particular applications, it will be apparent to those of ordinary skill in the art that numerous modifications in form, usage and details of implementation can be made without the exercise of inventive faculty, and without departing from the principles and concepts of the disclosure.

What is claimed is:

1. An object node apparatus, comprising:
a lockless-mode controller configured to communicatively couple to a plurality of storage resources and to a plurality of processor cores each preassigned to process a specific type of sub-task at a different preassigned storage resource of the plurality of storage resources that is configured to receive object input/output (I/O) only from the preassigned core of the plurality of processor cores, the lockless-mode controller being further configured to;
receive a plurality of object I/O messages from one or more clients, each to perform an object I/O task;
divide each object I/O task into a plurality of sub-tasks;
identify a specific sub-task type for each sub-task of the plurality of sub-tasks; and
send each sub-task identified for each specific sub-task type to a preassigned storage resource of the plurality of storage resources through a specific processor core of the plurality of processor cores that is preassigned to the preassigned storage resource of the plurality of storage resources for processing the specific sub-task type in a lockless mode, wherein the sub-tasks include storage operations related to storing sub-object data in, or retrieving sub-object data from, the preassigned storage resource of the plurality of storage resources for each processor core of the plurality of processor cores.

2. The apparatus of claim 1, wherein, to send each sub-task for each specific sub-task type to a processor core of the plurality of processor cores that is preassigned to process the specific sub-task type, the lockless-mode controller is further configured to send each sub-task to a sub-task-specific I/O queue.

3. The apparatus of claim 1, wherein, to send each sub-task for each specific sub-task type to a processor core of the plurality of processor cores that is preassigned to process the specific sub-task type, the lockless-mode controller is further configured to send each sub-task to a common queue.

4. The apparatus of claim 3, wherein each processor core of the plurality of processor cores that is preassigned to process the specific sub-task type further comprises a listen unit configured to:
listen for a sub-task on the common queue having a specific sub-task type matching the preassigned specific sub-task type of an associated processor core; and
retrieve the sub-task from the common queue.

5. The apparatus of claim 1, further comprising:
a hash engine communicatively coupled to the lockless-mode controller, wherein, to divide each object I/O task into the plurality of sub-tasks, the hash engine is configured to:
generate a hash value for each sub-task using a consistent hashing technique; and
use at least a portion of the hash value to identify, in a lookup table, a processor core of the plurality of processor cores for each sub-task.

6. The apparatus of claim 5, wherein the hash value is calculated using an identifier for a sub-object associated with the sub-task.

7. The apparatus of claim 1, further comprising:
a lock-mode controller communicatively coupled to the plurality of processor cores and configured to;
receive a non-I/O message to perform a non-I/O task;
determine that the non-I/O task requires processing at a storage resource of the plurality of storage resources that is above a processing threshold sufficient to slow object I/O performance;
send the non-I/O task to the storage resource of the plurality of storage resources through the processor core of the plurality of processor cores that is preassigned to the storage resource of the plurality of storage resources;
select a different processor core processing object I/O sub-tasks at a different memory resource to which the different processor was preassigned;
reallocate the different processor to the storage resource of the plurality of storage resources to co-process the non-I/O task with the processor core of the plurality of processor cores in a lock-mode; and
reallocate the different processor back to the different memory resource to resume object I/O sub-task processing.

8. An object node in a distributed object store system, the object node comprising:
a plurality of processor cores each preassigned to process a specific type of sub-task at a different preassigned storage resource of a plurality of storage resources, wherein each preassigned storage resource of the plurality of storage resources is configured to receive object input/output (I/O) only from a single preassigned core of the plurality of processor cores; and
a lockless-mode controller communicatively coupled to the plurality of processor cores and configured to communicatively couple to the plurality of storage resources, the lockless-mode controller being further configured to;
receive a plurality of object I/O messages from one or more clients, each to perform an object I/O task;
divide each object I/O task into a plurality of sub-tasks;
identify a specific sub-task type for each sub-task of the plurality of sub-tasks; and
send each sub-task for each specific sub-task type to a preassigned storage resource of the plurality of storage resources through a specific processor core of the plurality of processor cores that is preassigned to the storage resource of the plurality of storage resources for processing the specific sub-task type in a lockless mode, wherein the sub-tasks include storage operations related to storing sub-object data in, or retrieving sub-object data from, the preassigned storage resource of the plurality of storage resources for each processor core.

9. The object node of claim 8, wherein the lockless-mode controller further comprises:
a message decoder configured to decode the object I/O messages to identify the object I/O task for each object I/O message; and
a message router configured to send each sub-task for each specific sub-task type to a processor core of the plurality of processor cores that is preassigned to process the specific sub-task type.

10. The object node of claim 8, wherein, to send each sub-task for each specific sub-task type to a processor core of the plurality of processor cores that is preassigned to process the specific sub-task type, the lockless-mode controller is further configured to send each sub-task to a sub-task-specific I/O queue.

11. The object node of claim 8, wherein, to send each sub-task for each specific sub-task type to a processor core of the plurality of processor cores that is preassigned to process the specific sub-task type, the lockless-mode controller is further configured to send each sub-task to a common queue.

12. The object node of claim 11, wherein each processor core of the plurality of processor cores that is preassigned to process each specific sub-task type further comprises a listen unit configured to:
listen for a sub-task on the common queue having a specific sub-task type matching the preassigned specific sub-task type of an associated processor core; and
retrieve the sub-task from the common queue.

13. The object node of claim 8, further comprising:
a hash engine communicatively coupled to the lockless-mode controller, wherein, to divide each object I/O task into the plurality of sub-tasks, the hash engine is configured to:
generate a hash value for each sub-task using a consistent hashing technique; and
use at least a portion of the hash value to identify, in a lookup table, a processor core of the plurality of processor cores for each sub-task.

14. The object node of claim 13, wherein the hash value is calculated using an identifier for a sub-object associated with the sub-task.

15. The object node of claim 8, further comprising:
a lock-mode controller communicatively coupled to the plurality of processor cores and configured to;
receive a non-I/O message to perform a non-I/O task;
determine that the non-I/O task requires processing at a storage resource of the plurality of storage resources that is above a processing threshold sufficient to slow object I/O performance;
send the non-I/O task to the storage resource of the plurality of storage resources through the processor core of the plurality of processor cores that is preassigned to the storage resource of the plurality of storage resources;
select a different processor core processing object I/O sub-tasks at a different memory resource to which the different processor was preassigned;
reallocate the different processor to the storage resource of the plurality of storage resources to co-process the non-I/O task with the processor core of the plurality of processor cores in a lock mode; and
reallocate the different processor back to the different memory resource to resume object I/O sub-task processing.

16. A method for storing object data in a distributed object store, comprising:
receiving, at an object node, a plurality of object I/O messages from one or more clients, each to perform an object I/O task;
dividing, using a lockless-mode controller in the object node, each object I/O task into a plurality of sub-tasks;
identifying, using the lockless-mode controller, a specific sub-task type for each sub-task; and
sending each sub-task for each specific sub-task type to a preassigned storage resource in the object node through a specific processor core in the object node preassigned to the storage resource for processing the specific sub-task type in a lockless mode, wherein the sub-tasks include storage operations related to storing sub-object data in, or retrieving sub-object data from, a preassigned storage resource for each processor core.

17. The method of claim 16, wherein sending each sub-task for each specific sub-task type to a processor core in the object node that has been preassigned to process the specific sub-task type further comprises sending each sub-task to a sub-task-specific I/O queue.

18. The method of claim 17, wherein the sub-task-specific I/O queue serves tasks to multiple processor cores that have been preassigned for the specific sub-task type of the sub-task-specific I/O queue.

19. The method of claim 17, wherein the sub-task-specific I/O queue serves tasks to a single processor core that has been preassigned for the specific sub-task type of the sub-task-specific I/O queue.

20. The method of claim 16, wherein in sending each sub-task for each specific sub-task type to a processor core preassigned to process the specific sub-task type, the method further comprises, using the lockless-mode controller, sending each sub-task to a common queue.

21. The method of claim 20, the method further comprising:
listening for a sub-task on the common queue having a specific sub-task type matching the preassigned specific sub-task type of an associated processor core; and
retrieving the sub-task from the common queue.

22. The method of claim 16, wherein to divide each object I/O task into the plurality of sub-tasks, the method further comprises:
generating a hash value for each sub-task using a consistent hashing technique; and
using at least a portion of the hash value to identify, in a lookup table, a processor core for each sub-task.

23. The method of claim 22, wherein the hash value is calculated using a name of an object associated with the task.

24. The method of claim 16, further comprising:
receiving, at a lock-mode controller, a non-I/O message to perform a non-I/O task;
determining that the non-I/O task requires processing at a storage resource that is above a processing threshold sufficient to slow object I/O performance;
sending the non-I/O task to the storage resource through the processor core preassigned to the storage resource;
selecting a different processor core processing object I/O sub-tasks at a different memory resource to which the different processor was preassigned;
reallocating the different processor to the storage resource to co-process the non-I/O task with the processor core in a lock-mode; and
reallocating the different processor back to the different memory resource to resume object I/O sub-task processing.

* * * * *